United States Patent
Rao et al.

(10) Patent No.: US 6,452,535 B1
(45) Date of Patent: Sep. 17, 2002

(54) METHOD AND APPARATUS FOR IMPACT CRASH MITIGATION

(75) Inventors: Manoharprasad K. Rao, Novi; Gary Steven Strumolo, Beverly Hills; Ronald Hugh Miller, Saline, all of MI (US)

(73) Assignee: Ford Global Technologies, Inc., Dearborn, MI (US)

( * ) Notice: Subject to any disclaimer, the term of this patent is extended or adjusted under 35 U.S.C. 154(b) by 0 days.

(21) Appl. No.: 09/683,637

(22) Filed: Jan. 29, 2002

(51) Int. Cl.$^7$ .............................................. G01S 13/93
(52) U.S. Cl. ............................ 342/72; 342/42; 342/43; 342/52; 342/55; 342/70; 342/71; 342/195; 342/54; 356/4.01; 356/27; 356/28; 340/436; 340/901; 340/902; 340/903; 701/300; 701/301
(58) Field of Search .............................. 342/27, 28, 29, 342/30, 31, 32, 36–59, 70, 71, 72, 175, 195; 701/300, 301, 302; 340/436, 901, 902–905, 933, 961; 356/3, 4.01, 27, 28, 28.5

(56) References Cited

U.S. PATENT DOCUMENTS

| | | | | | |
|---|---|---|---|---|---|
| 5,629,691 | A | * | 5/1997 | Jain | 340/961 |
| 5,933,099 | A | * | 8/1999 | Mahon | 340/961 |
| 6,025,796 | A | * | 2/2000 | Crosby, II | 342/70 |
| 6,026,347 | A | * | 2/2000 | Schuster | 701/301 |

* cited by examiner

Primary Examiner—Bernarr E. Gregory
(74) Attorney, Agent, or Firm—Frank A. MacKenzie

(57) ABSTRACT

A pre-crash sensing system is provided for sensing an impact of a target vehicle (46) with a host vehicle (12). The target vehicle (46) has side transponders that generate side identification signals. The host vehicle (12) has a remote object sensor (20) that generates an object distance signal in response to the target vehicle. A countermeasure system (42) resides in the host vehicle (12). A controller (14) in the host vehicle is coupled to the remote object sensor (20) and the countermeasure system (42). The controller (14) activates the countermeasure in response to the object distance signal and side identification signal.

20 Claims, 3 Drawing Sheets

METHOD AND APPARATUS FOR IMPACT CRASH MITIGATION

BACKGROUND OF INVENTION

The present invention relates to pre-crash sensing systems for automotive vehicles, and more particularly, to side impact pre-crash sensing systems having countermeasures operated in response to pre-crash detection.

Auto manufacturers are investigating radar, lidar, and vision-based pre-crash sensing systems to improve occupant safety. Current vehicles typically employ accelerometers that measure decelerations acting on the vehicle body in the event of a crash. In response to accelerometers, airbags or other safety devices are employed.

In certain crash situations it would be desirable to provide information before forces actually act upon the vehicle when a collision is unavoidable. One example is a side impact situation where the countermeasure deployment time is relatively long compared to the crash event.

As mentioned above, known systems employ combinations of radar, lidar and vision systems to detect the presence of an object in front of the vehicle a predetermined time before an actual crash occurs. Drawbacks to such systems are that the orientation of the object is typically not taken into consideration in the deployment of such countermeasure devices.

It would be desirable to provide a system that takes into consideration the orientation the object detected.

SUMMARY OF INVENTION

The present invention provides an improved pre-crash sensing system that deploys a countermeasure in response to the orientation of the object detected.

In one aspect of the invention, a pre-crash sensing system is provided for sensing an impact of a target vehicle with a host vehicle. The target vehicle has side transponders that generate identification signals. The host vehicle has a remote object sensor that generates an object distance in response to the target vehicle. A countermeasure system resides in the host vehicle. A controller in the host vehicle is coupled to the first sensor and the countermeasure system. The controller activates the countermeasure in response to the object distance, relative velocity and side identification signal.

In a further aspect of the invention, a method for operating a pre-crash sensing system for a host vehicle when approaching a target vehicle generating an identification signal includes detecting an object in front of the host vehicle, determining an object distance, object relative velocity, receiving the side identification signal from the target vehicle, and activating the countermeasure system in response to the object distance, relative velocity and identification signal.

Other aspects and features of the present invention will become apparent when viewed in light of the detailed description of the preferred embodiment when taken in conjunction with the attached drawings and appended claims.

DETAILED DESCRIPTION

Figure 1:
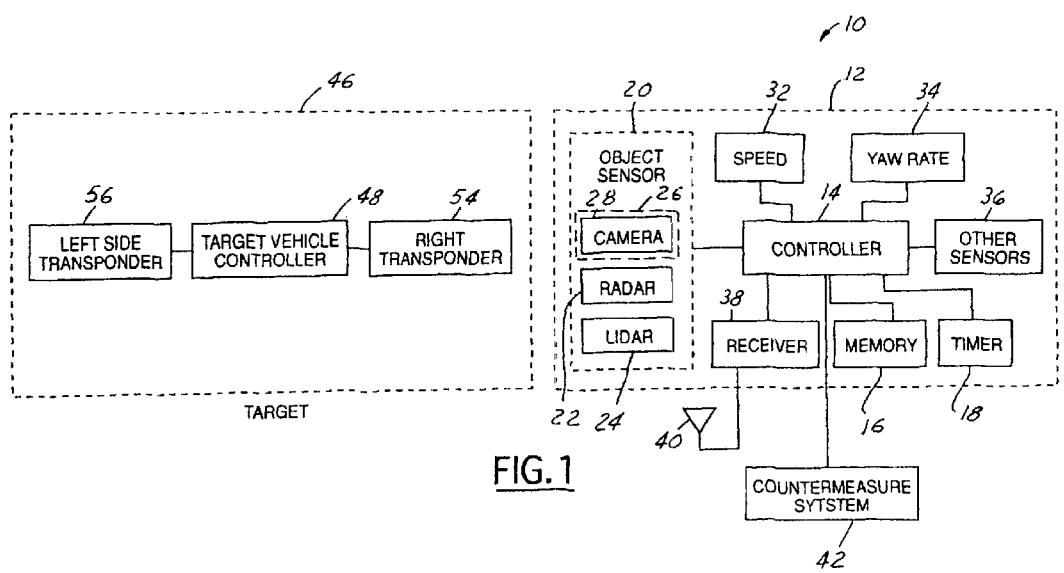
FIG. 1 is a block diagrammatic view of a pre-crash system according to the present invention.

In the following figures the same reference numerals will be used to identify the same components in the various views. While the present invention is illustrated with respect to several types of object sensors, various types and combinations of object sensors may be used as will be further described below. Likewise, various types of transponders and different methods for activating the transponders may also be used.

Referring now to FIG. 1, a pre-crash sensing system for a host vehicle 12 has a controller 14. Controller 14 is preferably a microprocessor-based controller that is coupled to a memory and a timer 18. Memory 16 and timer 18 are illustrated as separate components from that of controller 12. However, those skilled in the art will recognize that a memory 16 and timer 18 may be incorporated into controller 14.

Memory 16 may comprise various types of memory including read only memory, random access memory, electrically erasable programmable read only memory, and keep alive memory. Memory 14 is used to store various thresholds and parameters as will be further described below.

Timer 18 is a timer such as a clock timer of a central processing unit within controller 14. Timer 18 is capable of timing the duration of various events as well as counting up or counting down. A remote object sensor 20 is coupled to controller 14. Remote object sensor 20 generates an object signal in the presence of an object within a detection zone in front of host vehicle 12. Object sensor 20 may be comprised of one or more types of sensors including a radar 22, a lidar 24, and a vision system 26. Vision system 26 may be comprised of one or more cameras 28. Radar 22, lidar 24, and a stereo pair of cameras 28 are capable of sensing the presence and the distance of an object from the vehicle. As will be further described below, radar 22 or lidar 24 may be used to detect an object within a detection zone in front of vehicle 12. Also, several radars or lidars may be used to determine the distance to an object using well-known triangulation techniques.

A speed sensor 32 is also coupled to controller 14. Speed sensor 32 may be one of a variety of speed sensors known to those skilled in the art. For example, a suitable speed sensor may include a sensor at every wheel that is averaged by controller 14. Preferably, controller 14 translates the wheel speeds into the speed of the vehicle. Suitable types of speed sensors may include, for example, toothed wheel sensors such as those employed on antilock brake systems.

A yaw rate sensor 34 is coupled to controller 14. Yaw rate sensor 34 provides the yaw rate of the vehicle about the center of gravity of the vehicle. The yaw rate measures the rotational tendency of the vehicle about an axis normal to surface of the road. The yaw rate sensor is preferably located at the center of gravity. However, those skilled in the art will recognize that the yaw rate sensor may be located in various locations of the vehicle and translated back to the center of gravity through calculations within controller 14 in a known manner.

Other sensors 36 may also be coupled to controller 14. Other sensors may include a steering wheel angle sensor that measures the handwheel angle, a lateral acceleration sensor, a longitudinal acceleration sensor, pitch rate sensor, or other sensors that provide feedback as to the position of components of the vehicle. The signals received from the above described host vehicle sensors may be used for collision threat assessment along with the remote object sensor signals.

Controller 14 may also be coupled to a receiver 38 coupled to an antenna 40. Receiver 38 obtains RF signals such as a side identification signal as will be further described below.

A simplified target vehicle 46 is illustrated adjacent to host vehicle 12. Target vehicle 46 has a target vehicle controller 48. Target vehicle controller 48 is coupled to a right side transponder 54, and a left side transponder 56. Although transponders 54 and 56 are illustrated coupled to a central controller 48, transponders may be independent circuits. Each of the transponders may generate various types of information such as an identification signal for the vehicle. The transponders may operate in various different modes including a mode in which information is continuously broadcast. Another mode may include being activated by radar 22 of object vehicle 12. That is, when the host vehicle is within a range of target vehicle 46, the closest transponder recognizes the radar signal and returns an identification signal. The transponders may also recognize a laser used by a lidar-type system.

A countermeasure system 42 is coupled to controller 14. Countermeasure system 42 may, for example, include various types of countermeasures including a brake actuation device, a suspension height adjustment means that allows the nose of the host vehicle to dip. Other countermeasures may include various types of airbags including front bumper airbags. Head restraint control, pedal control, steering column position control, pedestrian protection device control, knee bolster control, and seat belt control may also be a part of countermeasure system 42.

Figure 2:
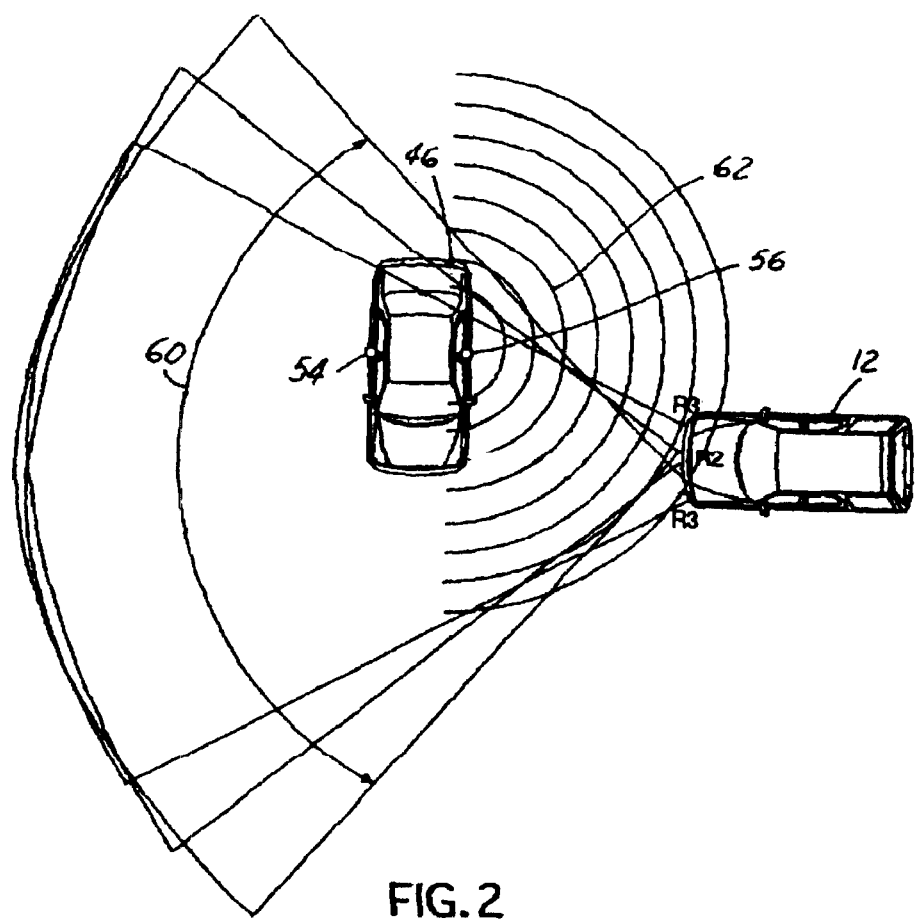
FIG. 2 is a top view of a host vehicle relative to a target vehicle.

Referring now to FIG. 2, host vehicle 12 is illustrated having three radar sources, R1, R2, and R3. Target vehicle is illustrated having side transponder 54 and side transponder 56. As can be seen, the field of view 60 of the combination of the three radar sources includes target vehicle 46. A left side identification signal 62 is transmitted to the receiver within host vehicle 12. The host vehicle 12 uses the side identification signal as a confirmation that the host vehicle is about to impact the side of the target vehicle to activate a countermeasure.

Figure 3:
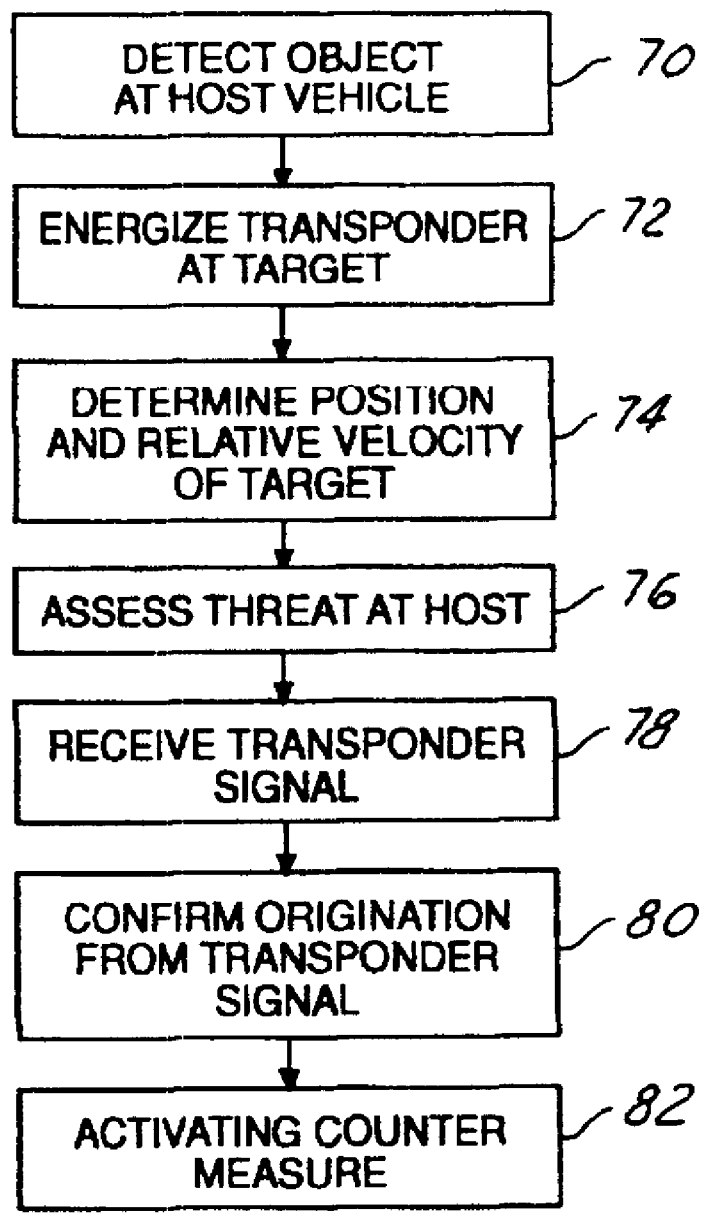
FIG. 3 is a flow chart of the operation of the system of FIG. 1.

Referring now to FIG. 3, in step 70 an object is detected at the host vehicle. The transponder 56 of the target vehicle is energized. Although step 72 is illustrated after step 70, the transponders may be continuously energized in the presence of radar or laser signal of the host vehicle as described above.

In step 74, by means of the remote object sensor, the position and relative velocity of the target vehicle is determined. By knowing the relative velocity and position, the potential or likelihood of a crash occurring is determined by means of suitable threat assessment algorithms known to one skilled in the art of remote object sensing based filtering and tracking. In step 76, using information from the remote sensors and the host vehicle sensors, the presence of a threat is assessed. That is, the risk or likelihood of a collision is assessed. In step 78 the transponder signal from the target vehicle is received. The transponder signal is analyzed to determine whether the host vehicle is on a collision course with the side of the target vehicle. In step 80, the orientation of the target vehicle is confirmed at the host vehicle. When a side identification signal is received in step 80, the countermeasure such as suspension height adjustment to lower the front end of the host vehicle is activated.

While particular embodiments of the invention have been shown and described, numerous variations and alternate embodiments will occur to those skilled in the art. Accordingly, it is intended that the invention be limited only in terms of the appended claims.

What is claimed is:

1. A pre-crash sensing system for sensing a collision with a target vehicle having a side transponder generating an identification signal comprising:

a remote object sensor generating an object distance signal;

a countermeasure system;

a controller coupled to said remote object sensor and said countermeasure for activating said countermeasure in response to said object distance signal and said identification signal.

2. A system as recited in claim 1 wherein said remote object sensor comprises a radar sensor system.

3. A system as recited in claim 1 wherein said remote object sensor comprises a vision sensor system.

4. A system as recited in claim 1 wherein said remote object sensor comprises a lidar sensor system.

5. A system as recited in claim 1 wherein said remote object sensor generates an object relative velocity signal; said controller activating said countermeasure in response to said object distance, said object relative velocity and said side identification signal.

6. A system as recited in claim 1 further comprising a yaw sensor generating a yaw rate signal and a vehicle speed sensor generating a vehicle speed signal; said controller activating said countermeasure in response to said object distance, said yaw rate, said vehicle speed, and said side identification signal.

7. A system as recited in claim 1 wherein activating the countermeasure comprises deploying airbags or changing a bumper height by activating a suspension height adjustment means.

8. A system as recited in claim 1 wherein said identification signal comprises a side identification signal.

9. A pre-crash sensing system comprising:

a target vehicle having a side transponder generating an identification signal; and a host vehicle comprising:
   a remote object sensor generating an object distance signal in response to said target vehicle;
   a countermeasure system having a counter measure; and
   a controller coupled to said remote object sensor and counter measure system,
   said controller activating said countermeasure in response to said object distance and said identification signal.

10. A system as recited in claim 9 wherein said remote object sensor comprises a radar sensor system.

11. A system as recited in claim 9 wherein said remote object sensor comprises a vision sensor system.

12. A system as recited in claim 9 wherein said remote object sensor comprises a lidar sensor system.

13. A system as recited in claim 9 wherein said remote object sensor generates an object relative velocity signal; said controller activating said countermeasure in response to said object distance, said object relative velocity and said identification signal.

14. A system as recited in claim 9 further comprising a yaw sensor generating a yaw rate signal and a vehicle speed sensor generating a vehicle speed signal; said controller activating said countermeasure in response to said object distance, said yaw rate, said vehicle speed, and said side identification signal.

15. A system as recited in claim 9 wherein activating the countermeasure comprises deploying airbags or changing a bumper height by activating a suspension height adjustment means.

16. A method for operating a pre-crash sensing system for a host vehicle when approaching a target vehicle generating an identification signal comprising:

receiving the side identification signal from the target vehicle; and detecting an object in front of the host vehicle;

determining an object distance;

activating the countermeasure system in response to the object distance and identification signal.

17. A method as recited in claim 16 further comprising determining object relative velocity; wherein activating the countermeasure system comprises activating the countermeasure system in response to the object distance, the object relative velocity and identification signal.

18. A method as recited in claim 16 wherein detecting an object comprises detecting the object with a radar.

19. A method as recited in claim 16 further comprising generating a yaw rate signal from a yaw sensor and a vehicle speed sensor generating a vehicle speed signal; wherein activating the countermeasure system comprises activating the countermeasure system in response to the object distance, the yaw rate signal, the vehicle speed signal and identification signal.

20. A method as recited in claim 16 wherein the target vehicle generates a side identification signal and activating the countermeasure system comprises activating the countermeasure system in response to the object distance and the side identification signal.

* * * * *